US012596387B2

(12) United States Patent
Nagai et al.

(10) Patent No.: US 12,596,387 B2
(45) Date of Patent: Apr. 7, 2026

(54) FLUID CONTROL DEVICE, FLUID CONTROL METHOD, AND FLUID CONTROL PROGRAM

(71) Applicant: HORIBA STEC, Co., Ltd., Kyoto (JP)

(72) Inventors: Kentaro Nagai, Kyoto (JP); Kazuhiro Matsuura, Kyoto (JP); Yoshiki Miyata, Kyoto (JP); Sota Matsumoto, Kyoto (JP); Yosuke Hisamori, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 519 days.

(21) Appl. No.: 18/147,199

(22) Filed: Dec. 28, 2022

(65) Prior Publication Data

US 2023/0229177 A1     Jul. 20, 2023

(30) Foreign Application Priority Data

Jan. 14, 2022     (JP) ................................. 2022-004482

(51) Int. Cl.
*G05D 7/06* (2006.01)
*F16K 37/00* (2006.01)

(52) U.S. Cl.
CPC ......... *G05D 7/0635* (2013.01); *F16K 37/005* (2013.01)

(58) Field of Classification Search
CPC .... F16K 31/007; F16K 37/005; G05D 7/0635
See application file for complete search history.

(56) References Cited

U.S. PATENT DOCUMENTS

| | | | |
|---|---|---|---|
| 11,914,407 B2 * | 2/2024 | Hirata | G05D 7/0635 |
| 2018/0283914 A1 * | 10/2018 | Sugita | G01F 1/50 |

| | | | |
|---|---|---|---|
| 2019/0094847 A1 * | 3/2019 | Nagase | G05D 7/0635 |
| 2020/0033896 A1 * | 1/2020 | Tseng | G05D 7/0647 |
| 2020/0292407 A1 * | 9/2020 | Matsumoto | F16K 37/0066 |
| 2021/0240208 A1 * | 8/2021 | Hirata | G05D 7/0647 |
| 2022/0413521 A1 * | 12/2022 | Matsumoto | G05D 16/028 |

(Continued)

FOREIGN PATENT DOCUMENTS

| | | |
|---|---|---|
| JP | 2020087164 A | 6/2020 |
| JP | 2021005361 A | 1/2021 |

OTHER PUBLICATIONS

Japan Patent Office, Office Action Issued in Application No. 2022004482, Aug. 26, 2025, 8 pages.

*Primary Examiner* — Vincent H Tran

(74) *Attorney, Agent, or Firm* — Alleman Hall LLP

(57) ABSTRACT

A fluid control device includes a fluid resistance element provided to a channel, an upstream pressure sensor configured to detect an upstream pressure of the fluid resistance element, a downstream pressure sensor configured to detect a downstream pressure of the fluid resistance element, a flow rate calculating unit configured to calculate a flow rate flowing through the channel based on the upstream and downstream pressures, a valve provided upstream of the upstream pressure sensor or downstream of the downstream pressure sensor, and a valve control unit configured to control the valve based on the calculated flow rate. When the valve is fully closed, the flow rate calculating unit is configured to calculate the flow rate by switching a first flow rate calculation formula that is used when the valve is open, to a second flow rate calculation formula that is different from the first flow rate calculation formula.

7 Claims, 4 Drawing Sheets

(56) References Cited

U.S. PATENT DOCUMENTS

| | | | |
|---|---|---|---|
| 2023/0213951 A1* | 7/2023 | McKeon | E21B 34/02 |
| | | | 166/53 |
| 2023/0229177 A1* | 7/2023 | Nagai | F16K 31/007 |
| | | | 700/282 |

* cited by examiner

FLUID CONTROL DEVICE, FLUID CONTROL METHOD, AND FLUID CONTROL PROGRAM

BACKGROUND

Technical Field

The present invention relates to a fluid control device, a fluid control method, and a fluid control program.

Related Art

Conventionally, as disclosed in Patent Document 1, there has been a fluid control device that includes a control valve provided upstream of a throttle, a first pressure sensor provided upstream of the throttle and downstream of the control valve, a second pressure sensor provided downstream of the throttle, an incoming flow pressure sensor provided upstream of the control valve, and a control circuit controlling the control valve. When the control valve is fully closed, this fluid control device detects outflow (seat leakage) of the control valve based on temporal changes of the incoming flow pressure measured by the incoming flow pressure sensor, of the upstream pressure measured by the first pressure sensor, and of a downstream pressure measured by the second sensor, the pressures being those after the upstream pressure and the downstream pressure reach an equilibrium pressure.

PRIOR ART DOCUMENT

Patent Document

Patent Document 1: JP 2020-87164 A

SUMMARY

When seat leakage occurs in the conventional fluid control device, gas accumulated on a primary side (upstream side of the control valve) flows into a secondary side (downstream side of the control valve), and as a result, the pressure on the secondary side increases. Specifically, both the upstream and the downstream pressures that are secondary-pressures increase.

A conventional fluid control device uses a flow rate calculation formula that uses a difference between an exponentiation of the upstream pressure and an exponentiation of the downstream pressure (specifically, the square of the downstream pressure subtracted from the square of the upstream pressure). Therefore, with the upstream pressure and the downstream pressure increased due to the seat leakage, the difference between the square of the upstream pressure and the square of the downstream pressure increases, even if the differential pressure remains the same. As a result, as illustrated in FIG. 4, the flow rate calculated by the flow rate calculation formula becomes increased, and the zero point becomes shifted.

Therefore, the present invention has been made in view of the above-described problems, and a main object thereof is to improve the accuracy of a flow rate measurement when the valve is fully closed.

Solution to Problem

In other words, a fluid control device according to the present invention is characterized in including: a fluid resistance element provided to a channel; an upstream pressure sensor configured to detect an upstream pressure upstream of the fluid resistance element; a downstream pressure sensor configured to detect a downstream pressure downstream of the fluid resistance element; a flow rate calculating unit configured to calculate a flow rate flowing through the channel based on the upstream pressure and the downstream pressure; a valve provided upstream of the upstream pressure sensor or downstream of the downstream pressure sensor; and a valve control unit configured to control the valve based on the flow rate calculated by the flow rate calculating unit, and that the flow rate calculating unit is configured to calculate the flow rate, when the valve is fully closed, by switching a first flow rate calculation formula that is used when the valve is open, to a second flow rate calculation formula that is different from the first flow rate calculation formula.

With such a fluid control device according to the present embodiment configured as described above, when the fluid control valve is fully closed, the first flow rate calculation formula used when the fluid control valve is open is switched to the second flow rate calculation formula that is different from the first flow rate calculation formula. Therefore, the flow rate can be calculated accurately even when the pressure fluctuation occurs due to outflow (seat leakage) of the fluid control valve.

As a specific mode of the flow rate calculating unit, the flow rate calculating unit is preferably configured to, when the valve is fully closed, calculate the flow rate by switching the first flow rate calculation formula that uses a difference between an exponentiation of the upstream pressure (raised to a power higher than 1) and an exponentiation of the downstream pressure (raised to a power higher than 1) to a second flow rate calculation formula that uses a difference between the upstream pressure and the downstream pressure.

As a specific mode of switching the flow rate calculation formula, the flow rate calculating unit is preferably configured to, when a difference between the upstream pressure and the downstream pressure is less than a predetermined switching threshold, calculate the flow rate by switching the first flow rate calculation formula to the second flow rate calculation formula.

As another specific mode of switching the flow rate calculation formula, the flow rate calculating unit is preferably configured to, when the flow rate calculated by the first flow rate calculation formula is in a stable state, calculate the flow rate by switching the first flow rate calculation formula to the second flow rate calculation formula. With this configuration, it is possible to prevent frequent switching between the first flow rate calculation formula and the second flow rate calculation formula.

In addition, if the first flow rate calculation formula and the second flow rate calculation formula are switched simply by comparing the difference with a predetermined switching threshold, these flow rate calculation formulas may become switched frequently, and cause the flow rate to change irregularly. In order to suitably solve this problem, hysteresis is preferably provided to a predetermined switching threshold. Specifically, the flow rate calculating unit is preferably configured to, when the difference between the upstream pressure and the downstream pressure is less than a value resultant of subtracting hysteresis from the predetermined switching threshold, calculate the flow rate by switching the first flow rate calculation formula to the second flow rate calculation formula.

As a specific mode of switching the second flow rate calculation formula to the first flow rate calculation formula, the flow rate calculating unit is preferably configured to, when a difference between the upstream pressure and the downstream pressure is equal to or greater than a predetermined switching threshold, calculates the flow rate by switching the second flow rate calculation formula to the first flow rate calculation formula.

In addition, when the conventional fluid control device is used in a semiconductor manufacturing apparatus, pneumatic valves are provided upstream and downstream of the fluid control device, respectively, in order to improve maintainability, e.g., in removing the fluid control device or avoiding wafer damage caused by valve outflow (seat leakage).

These pneumatic valves are often designed to be closed simultaneously, when the flow rate setting of the fluid control device is 0% (fully closed), and the gas having been flowing before the pneumatic valves are closed remains inside the fluid control device, and the pressure inside the fluid control device is kept somewhat high.

If zero adjustment for the flow rate of the fluid control device is to be carried out in this condition, it is necessary to perform a special sequence to vacuum the internal channel of the fluid control device for the zero adjustment, separately from the sequence required for the semiconductor manufacturing process.

Therefore, a fluid control device according to the present invention includes: a fluid resistance element provided in a channel; an upstream+pressure sensor that detects an upstream pressure of the fluid resistance element; a downstream pressure sensor that detects a downstream pressure of the fluid resistance element; a flow rate calculating unit that calculates a flow rate flowing through the channel based on the upstream pressure and the downstream pressure; a valve provided upstream of the upstream pressure sensor or downstream of the downstream pressure sensor; and a valve control unit that controls the valve based on the flow rate calculated by the flow rate calculating unit, in which when the valve is fully closed, the flow rate calculating unit detects that a difference between the upstream pressure and the downstream pressure has remained within a certain range for a predetermined time period, and corrects one of the upstream pressure and the downstream pressure to match another.

With this configuration, the difference (offset caused by a drift) between the upstream pressure detected by the upstream pressure sensor and the downstream pressure detected by the downstream pressure sensor is automatically detected, and the upstream pressure and the downstream pressure are adjusted to the same level. Therefore, it is possible to reduce the temporal changes in the flow rate accuracy, without performing a special sequence for the zero adjustment for the flow rate.

As a specific mode of the correction of the flow rate calculating unit, the flow rate calculating unit is preferably configured to, when the valve is fully closed, detect that a standard deviation of the difference between the upstream pressure and the downstream pressure has remained within a certain range for a predetermined time period, and to correct one of the upstream pressure and the downstream pressure so as to match another.

The upstream pressure is a high pressure and the downstream pressure is a low pressure (vacuum). Therefore, if correction is made by adjusting the upstream pressure to the downstream pressure in the flow rate calculation formula using the difference between an exponentiation of the upstream pressure (raised to a power higher than 1) and an exponentiation of the downstream pressure (raised to a power higher than 1), an error in the flow rate calculation may become increased. Therefore, the flow rate calculating unit is preferably configured to correct the downstream pressure to match the upstream pressure.

Furthermore, a fluid control method according to the present invention is a fluid control method using a fluid resistance element provided in a channel, an upstream pressure sensor that detects an upstream pressure of the fluid resistance element, a downstream pressure sensor that detects a downstream pressure of the fluid resistance element, a flow rate calculating unit that calculates a flow rate flowing through the channel based on the upstream pressure and the downstream pressure, a valve provided upstream of the upstream pressure sensor or downstream of the downstream pressure sensor, and a valve control unit that controls the valve based on the flow rate calculated by the flow rate calculating unit, the fluid control method including: the flow rate is calculated by switching the first flow rate calculation formula to a second flow rate calculation formula different from the first flow rate calculation formula.

Furthermore, a fluid control program according to the present invention is a fluid control program used in a fluid control device that includes: a fluid resistance element provided to a channel; an upstream pressure sensor configured to detect an upstream pressure upstream of the fluid resistance element; a downstream pressure sensor configured to detect a downstream pressure downstream of the fluid resistance element; a flow rate calculating unit configured to calculate a flow rate flowing through the channel based on the upstream pressure and the downstream pressure; a valve provided upstream of the upstream pressure sensor or downstream of the downstream pressure sensor; and a valve control unit configured to control the valve based on the flow rate calculated by the flow rate calculating unit, and the fluid control program characterized in causing the flow rate calculating unit to exert a function of calculating the flow rate, when the valve is fully closed, by switching a first flow rate calculation formula that is used when the valve is open to a second flow rate calculation formula that is different from the first flow rate calculation formula.

Furthermore, a fluid control method according to the present invention is a fluid control method using a fluid resistance element provided in a channel, an upstream pressure sensor that detects an upstream pressure of the fluid resistance element, a downstream pressure sensor that detects a downstream pressure of the fluid resistance element, a flow rate calculating unit that calculates a flow rate flowing through the channel based on the upstream pressure and the downstream pressure, a valve provided upstream of the upstream pressure sensor or downstream of the downstream pressure sensor, and a valve control unit that controls the valve based on the flow rate calculated by the flow rate calculating unit. The flow rate calculating unit detects, when the valve is fully closed, that a difference between the upstream pressure and the downstream pressure has remained within a certain range for a predetermined time period, and corrects one of the upstream pressure and the downstream pressure to match another.

In addition, a fluid control program according to the present invention is a fluid control program used in a fluid control device including: a fluid resistance element provided to a channel; an upstream pressure sensor configured to detect an upstream pressure upstream of the fluid resistance element; a downstream pressure sensor configured to detect a downstream pressure downstream of the fluid resistance element; a flow rate calculating unit configured to calculate a flow rate flowing through the channel based on the upstream pressure and the downstream pressure; a valve provided upstream of the upstream pressure sensor or downstream of the downstream pressure sensor; and a valve control unit configured to control the valve based on the flow rate calculated by the flow rate calculating unit, the fluid control program being characterized in causing the flow rate calculating unit to exert a function, when the valve is fully closed, of detecting that a difference between the upstream pressure and the downstream pressure has remained within a certain range for a predetermined time period, and correcting one of the upstream pressure and the downstream pressure so as to match another.

According to the present invention described above, it is possible to improve the accuracy of a flow rate measurement when a valve is fully closed.

DETAILED DESCRIPTION

Figure 1:
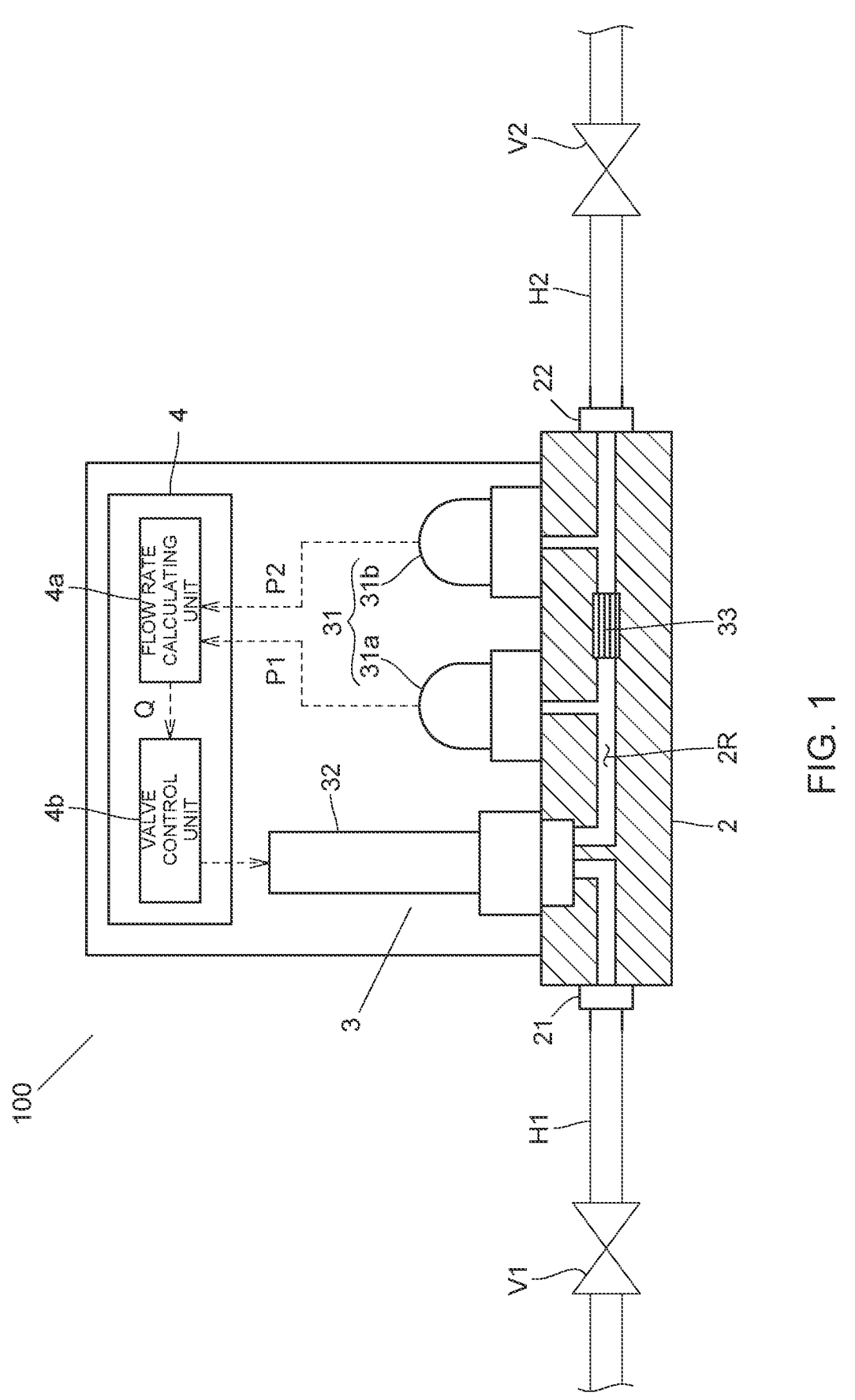
FIG. 1 is a diagram schematically illustrating a configuration of a fluid control device according to one embodiment of the present invention.

A fluid control device according to an embodiment of the present invention will now be explained with reference to some drawings. Note that, to facilitate understanding, all of the drawings described below are schematic representations, with some omissions and exaggerations made as appropriate. The same components are denoted by the same reference numerals, and the explanations thereof will be omitted as appropriate.

<Device Configuration>

A fluid control device 100 according to the present embodiment is used in, for example, a semiconductor manufacturing process, and is provided in one or more gas supply lines to control the flow rate of process gas that flows through each of such gas supply lines.

Specifically, the fluid control device 100 is a what is called a differential pressure mass flow controller (MFC), and includes a channel block 2 where a plurality of internal channels 2R are formed, and a fluid controller 3 that is mounted on the channel block 2, as illustrated in FIG. 1.

The channel block 2 is provided with an incoming port 21 via which a fluid is guided into the internal channel 2R, and an outgoing port 22 via which the fluid is guided out of the internal channel 2R. An upstream pipe H1 is connected to the incoming port 21, and the upstream pipe H1 is provided with an upstream pneumatic valve V1. The outgoing port 22 is connected to a downstream pipe H2, and the downstream pipe H2 is provided with a downstream pneumatic valve V2.

The fluid controller 3 controls the fluid in the internal channel 2R, and includes flow rate sensors 31 that measure the flow rates of the fluid flowing through the internal channel 2R, and a fluid control valve 32 provided upstream of the flow rate sensor 31. A control unit 4, which will be described later, feed-back controls the degree by which the fluid control valve 32 is opened.

The flow rate sensors 31 are differential pressure flow rate sensors, and include an upstream pressure sensor 31a provided upstream of the fluid resistance element 33, such as a restrictor or an orifice, provided inside the internal channel 2R, and a downstream pressure sensor 31b provided downstream of the fluid resistance element 33. A flow rate calculating unit 4a included in the control unit 4, which will be described later, calculates a flow rate Q flowing through the internal channel 2R using an upstream pressure P1 being upstream of the fluid resistance element 33 and detected by the upstream pressure sensor 31a, and a downstream pressure P2 being downstream of the fluid resistance element 33 and detected by the downstream pressure sensor 31b.

The fluid control valve 32 is provided upstream of the differential pressure flow rate sensor 31. Specifically, the fluid control valve 32 controls the flow rate by causing a piezoelectric actuator to advance and to retract a valve body with respect to a valve seat. The fluid control valve 32 is controlled by a valve control unit 4b included in the control unit 4.

The control unit 4 includes the flow rate calculating unit 4a that calculates the flow rate Q flowing through the internal channel 2R based on the upstream pressure P1 and the downstream pressure P2, and the valve control unit 4b that controls the fluid control valve 32 based on the flow rate Q calculated by the flow rate calculating unit 4a. Note that the control unit 4 is what is called a computer including a CPU, a memory, A/D and/D/A converters, and an input/output unit, for example, and functions as the flow rate calculating unit 4a, the valve control unit 4b, and the like, by executing a fluid control program stored in the memory, and by cooperating with various devices.

When the fluid control valve 32 is fully closed, the flow rate calculating unit 4a according to the present embodiment calculates the flow rate Q by switching a first flow rate calculation formula Eq1 that is used when the fluid control valve 32 is open, to a second flow rate calculation formula Eq2 that is different from the first flow rate calculation formula Eq1.

Here, the first flow rate calculation formula Eq1 used when the fluid control valve 32 is open can be readily expressed by the following formula using an exponentiation of the upstream pressure P1 (squared, in this example) and an exponentiation of the downstream pressure P2 (squared, in this example).

$$Eq1 = k1 \times (P1^2 - P2^2)$$

Where k1 is a value determined by factors such as the temperature, viscosity, and compressibility of the fluid, and the shape of the fluid resistance element 33. Note that the exponentiation described above is not limited to squaring, and can be changed to any power higher than 1.

The second flow rate calculation formula Eq2 can be readily expressed by the following formula using the difference ($|P1 - P2|$) between the upstream pressure P1 and the downstream pressure P2.

$$Eq2 = k2 \times |P1 - P2|$$

Where k2 is a value determined by factors such as the temperature, viscosity, and compressibility of the fluid, and the shape of the fluid resistance element 33.

More specifically, the second flow rate calculation formula Eq2 can be expressed by the following formula using the flow rate $Q_{stable}$ obtained using the first flow rate calculation formula Eq1 in a stable state.

$$Eq2 = Q_{stable} \times (P1 - P2 / \Delta P_{stable})$$

Where $\Delta P_{stable}$ is a difference between the upstream pressure P1 and the downstream pressure P2 in a stable state.

When the fluid control valve 32 is fully closed, the flow rate calculating unit 4a calculates the flow rate Q by switching the first flow rate calculation formula Eq1 to the second flow rate calculation formula Eq2. When the fluid control valve 32 is fully closed, the upstream pneumatic valve V1 provided to the upstream pipe H1 and the downstream pneumatic valve V2 provided to the downstream pipe H2 are both closed.

When the difference between the upstream pressure P1 and the downstream pressure P2 is less than a predetermined switching threshold, the flow rate calculating unit 4a calculates the flow rate Q by switching the first flow rate calculation formula Eq1 to the second flow rate calculation formula Eq2. In the present embodiment, the flow rate calculating unit 4a switches the first flow rate calculation formula Eq1 to the second flow rate calculation formula Eq2 when the difference between the upstream pressure P1 and the downstream pressure P2 is less than a value obtained by subtracting hysteresis from the predetermined switching threshold. When the flow rate Q calculated by the first flow rate calculation formula Eq1 is in a stable state, the flow rate calculating unit 4a calculates the flow rate Q by switching the first flow rate calculation formula Eq1 to the second flow rate calculation formula Eq2.

By contrast, when the difference between the upstream pressure P1 and the downstream pressure P2 is equal to or greater than the predetermined switching threshold, the flow rate calculating unit 4a calculates the flow rate Q by switching the second flow rate calculation formula Eq2 to the first flow rate calculation formula Eq1.

As described above, by making the threshold for switching the first flow rate calculation formula Eq1 to the second flow rate calculation formula Eq2 (the hysteresis subtracted from the switching threshold) different from the threshold for switching the second flow rate calculation formula Eq2 to the first flow rate calculation formula Eq1 ("switching threshold"), it is made difficult to return to the first flow rate calculation formula Eq1 after the flow rate calculation formula is switched to the second flow rate calculation formula Eq2. In this manner, frequent switching of the flow rate calculation formulas is prevented.

Figure 2:
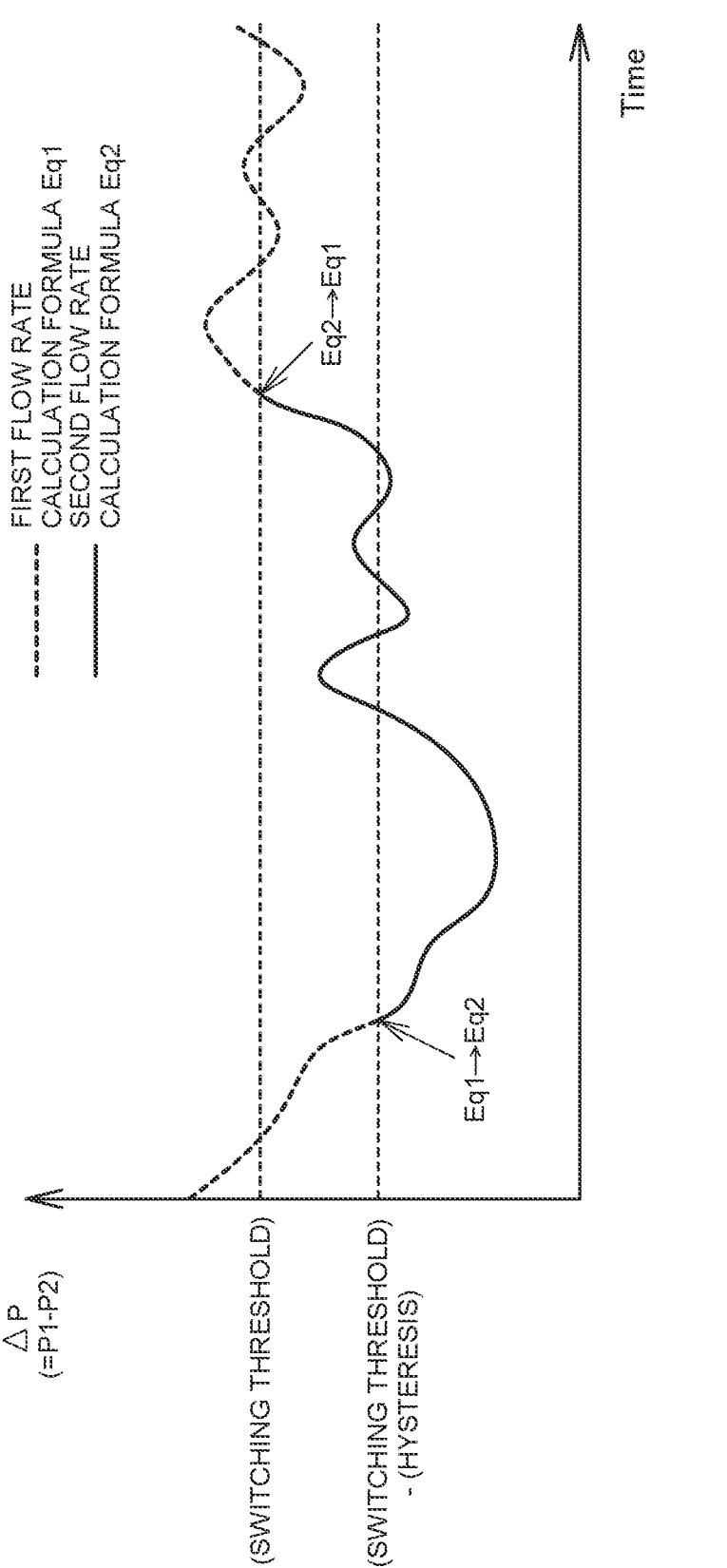
FIG. 2 is a schematic diagram illustrating switching of a flow rate calculation formula in the embodiment.

A conditional expression for switching the flow rate calculating unit 4a between the first flow rate calculation formula Eq1 and the second flow rate calculation formula Eq2 will now be explained. In this example, as illustrated in FIG. 2, the following conditional expressions are used in switching the flow rate calculation formula Eq1, Eq2. A function for switching the first flow rate calculation formula Eq1 to the second flow rate calculation formula Eq2 and vice versa can be switched ON or OFF.

(1) Switching the first flow rate calculation formula Eq1 to the second flow rate calculation formula Eq2 (that is, when the previous flow rate is calculated using the first flow rate calculation formula Eq1)

$$(\text{Switching threshold} - \text{Hysteresis}) > |P1 - P2| \text{ is established, and the flow rate is in a stable state.}$$

In the example herein, the switching threshold is a predetermined value. The hysteresis is, for example, 1 Torr, and is provided to prevent the flow rate calculation formulas from being switched frequently. Furthermore, being in a stable state is a state in which the flow rate Q calculated by the first flow rate calculation formula Eq1 remains within a predetermined range (e.g., ±0.1%) with respect to a target flow rate (e.g., flow rate setting of 0%) continuously for a predetermined time period.

(2) Switching the second flow rate calculation formula Eq2 to the first flow rate calculation formula Eq1 (that is, when the previous flow rate is calculated using the second flow rate calculation formula Eq2)

$$(\text{Switching threshold}) < |P1 - P2|$$

Where the switching threshold is the same as the switching threshold used in the conditional expression (1).

<Advantageous Effects Achieved by Present Embodiment>

In the fluid control device 100 according to the present embodiment configured as described above, while the fluid control valve 32 is fully closed, the first flow rate calculation formula Eq1 used when the fluid control valve 32 is open is switched to the second flow rate calculation formula Eq2 that is different from the first flow rate calculation formula Eq1. Therefore, the flow rate can be calculated accurately even if pressure fluctuation occurs due to outflow (seat leakage) of the fluid control valve.

<Other Embodiments>

In addition to the configuration for switching the flow rate calculation formulas in the manner described in the embodiment, it is also possible to use the following configuration, for example.

Figure 3:
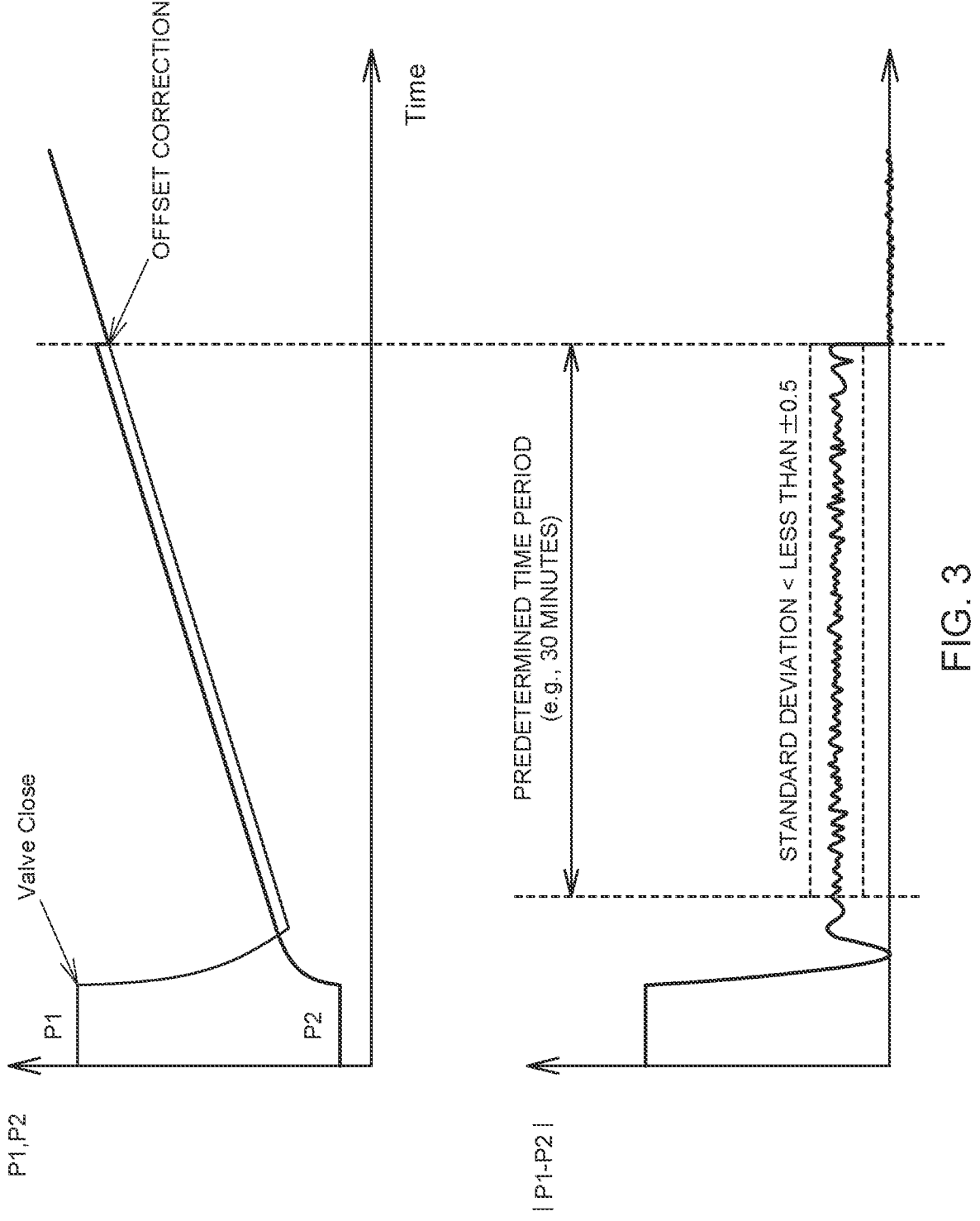
FIG. 3 is a diagram illustrating offset correction performed by a fluid control device according to a modified embodiment.
Figure 4:
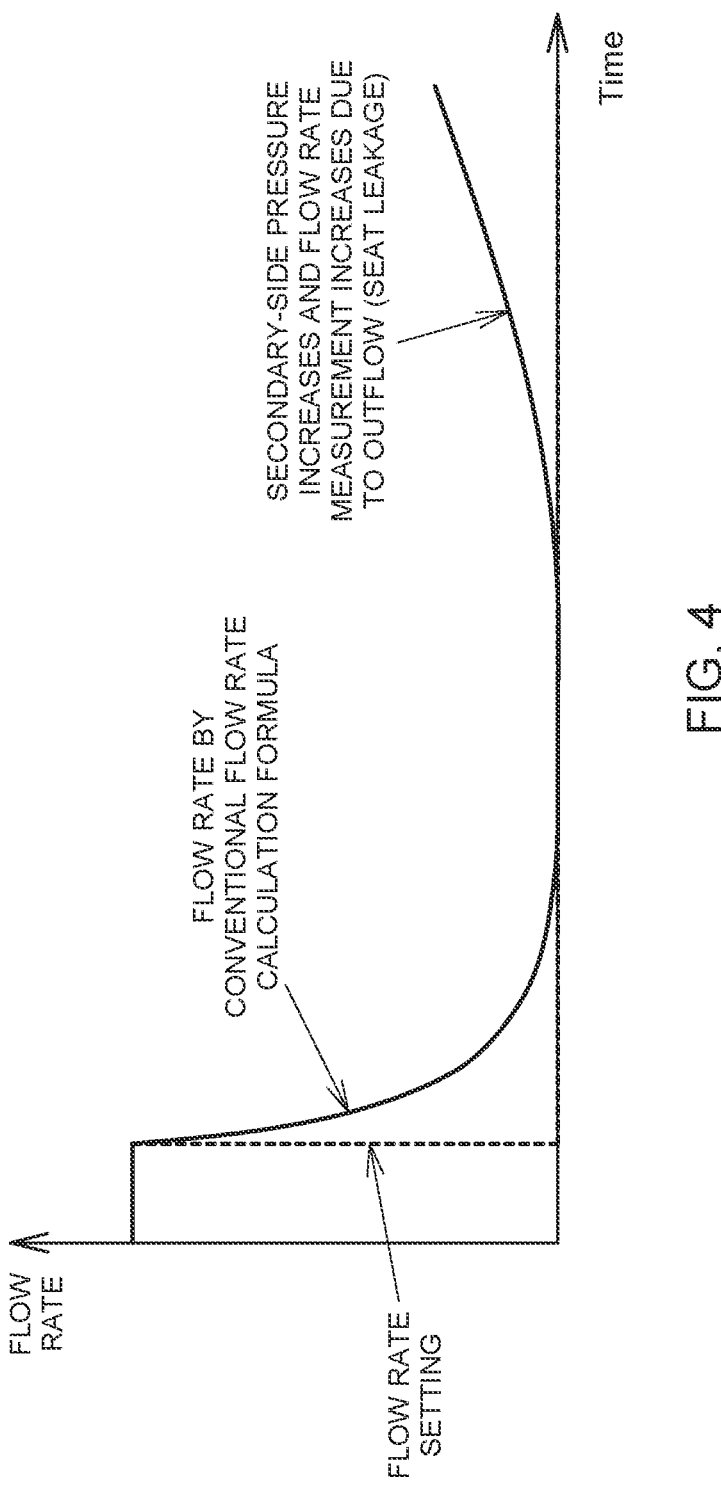
FIG. 4 is a schematic view illustrating a change in a flow rate measurement with outflow (seat leakage).

Specifically, as illustrated in FIG. 3, when the fluid control valve 32 is fully closed, the flow rate calculating unit 4a detects that the difference between the upstream pressure P1 and the downstream pressure P2 has remained within a certain range for a predetermined time period, and corrects one of the upstream pressure P1 and the downstream pressure P2 so as to match the other.

Specifically, when the fluid control valve 32 is fully closed, the flow rate calculating unit 4a detects that the standard deviation of the difference between the upstream pressure P1 and the downstream pressure P2 has remained within a certain range (for example, less than ±0.5) for a predetermined time period (e.g., 30 minutes), and corrects one of the upstream pressure P1 and the downstream pressure P2 so as to match the other.

Here, because the upstream pressure P1 is a high pressure and the downstream pressure P2 is a low pressure (vacuum), if correction is made to adjust the upstream pressure P1 to the downstream pressure P2 in the flow rate calculation formula that uses the difference between an exponentiation of the upstream pressure P1 (raised to a power higher than 1, in this example) and an exponentiation of the downstream pressure P2 (raised to a power higher than 1, in this example), an error in the flow rate calculation may become increased. Therefore, the flow rate calculating unit 4a corrects so as to match the downstream pressure P2 to the upstream pressure P1. Because the downstream pressure P2 is adjusted to the upstream pressure P1 in the manner described above, it is possible to reduce an error in the flow rate calculation when the flow rate calculation using a difference between an exponentiation of the upstream pressure P1 (raised to a power higher than 1, in this example) and an exponentiation of the downstream pressure P2 (raised to a power higher than 1, in this example).

It is also possible to adjust the upstream pressure P1 to the downstream pressure P2, or to adjust the upstream pressure P1 and the downstream pressure P2 to a pressure therebetween (e.g., median).

In the above embodiment, the fluid control valve 32 is provided upstream of the flow rate sensor 31, but may be provided downstream of the flow rate sensor 31.

Furthermore, in the above embodiment, the hysteresis is provided in the conditional expression for switching the first flow rate calculation formula to the second flow rate calculation formula, but it is also possible to use only the switching threshold without providing the hysteresis. It is also possible for the conditional expression for switching the first flow rate calculation formula to the second flow rate calculation formula not to include the stability of the flow rate calculated with the first flow rate calculation formula.

In addition, various modifications and combinations of the embodiments may be made within the scope not deviating from the gist of the present invention.

LIST OF REFERENCE CHARACTERS 100 fluid control device
2R channel
31a upstream pressure sensor
31b downstream pressure sensor
32 fluid control valve
33 fluid resistance element
4a flow rate calculating unit
4b valve control unit

What is claimed is:

1. A fluid control device comprising:
a fluid resistance element provided to a channel;
an upstream pressure sensor configured to detect an upstream pressure upstream of the fluid resistance element;
a downstream pressure sensor configured to detect a downstream pressure downstream of the fluid resistance element;
a valve provided upstream of the upstream pressure sensor or downstream of the downstream pressure sensor; and
a control unit that includes a memory storing a fluid control program and a processor configured to execute the fluid control program to calculate a flow rate flowing through the channel based on the upstream pressure and the downstream pressure, and to control the valve based on the flow rate, wherein
the processor is configured to calculate the flow rate, when the valve is fully closed, by switching a first flow rate calculation formula that is used when the valve is open, the first flow rate calculation formula using a difference between an exponentiation of the upstream pressure (raised to a power higher than 1) And an exponentiation of the downstream pressure (raised to a power higher than 1), to a second flow rate calculation formula that is different from the first flow rate calculation formula, the second flow rate calculation formula using a difference between the upstream pressure and the downstream pressure.

2. A fluid control device comprising:
a fluid resistance element provided to a channel;
an upstream pressure sensor configured to detect an upstream pressure upstream of the fluid resistance element;
a downstream pressure sensor configured to detect a downstream pressure downstream of the fluid resistance element;
a valve provided upstream of the upstream pressure sensor or downstream of the downstream pressure sensor; and
a control unit that includes a memory storing a fluid control program and a processor configured to execute the fluid control program to calculate a flow rate flowing through the channel based on the upstream pressure and the downstream pressure, and to control the valve based on the flow rate,
wherein the processor is configured to calculate the flow rate, when the valve is fully closed, by switching a first flow rate calculation formula that is used when the valve is open, to a second flow rate calculation formula that is different from the first flow rate calculation formula, and
wherein the processor is configured to calculate the flow rate by switching the first flow rate calculation formula to the second flow rate calculation formula when a difference between the upstream pressure and the downstream pressure is less than a predetermined switching threshold.

3. The fluid control device according to claim 2, wherein the processor is configured to calculate the flow rate by switching the first flow rate calculation formula to the second flow rate calculation formula when the flow rate calculated by the first flow rate calculation formula is in a stable state.

4. The fluid control device according to claim 2, wherein the processor is configured to calculate the flow rate by switching the first flow rate calculation formula to the second flow rate calculation formula when the difference between the upstream pressure and the downstream pressure is less than a value subtracting hysteresis from the predetermined switching threshold.

5. The fluid control device according to claim 2, wherein the processor is configured to calculate the flow rate by switching the second flow rate calculation formula to the first flow rate calculation formula when the difference between the upstream pressure and the downstream pressure is equal to or higher than the predetermined switching threshold.

6. A fluid control method that uses: a fluid resistance element provided to a channel; an upstream pressure sensor configured to detect an upstream pressure upstream of the fluid resistance element; a downstream pressure sensor configured to detect a downstream pressure downstream of the fluid resistance element; a valve provided upstream of the upstream pressure sensor or downstream of the downstream pressure sensor; and a control unit that includes a memory storing a fluid control program and a processor configured to execute the fluid control program to calculate a flow rate flowing through the channel based on the upstream pressure and the downstream pressure, and to control the valve based on the flow rate, the fluid control method comprising causing, when the valve is fully closed, the processor to calculate the flow rate, by switching a first flow rate calculation formula that is used when the valve is open, the first flow rate calculation formula using a difference between an exponentiation of the upstream pressure (raised to a power higher than 1) and an exponentiation of the downstream pressure (raised to a power higher than 1), to a second flow rate calculation formula that is different from the first flow rate calculation formula, the second flow rate calculation formula using a difference between the upstream pressure and the downstream pressure.

7. Memory storing instructions executable by a processor to, in a fluid control device that includes: a fluid resistance element provided to a channel; an upstream pressure sensor configured to detect an upstream pressure upstream of the fluid resistance element; a downstream pressure sensor configured to detect a downstream pressure downstream of the fluid resistance element; and a valve provided upstream of the upstream pressure sensor or downstream of the downstream pressure sensor, perform the steps of:

calculating a flow rate flowing through the channel based on the upstream pressure and the downstream pressure;

controlling the valve based on the flow rate; and calculating the flow rate, when the valve is fully closed, by switching a first flow rate calculation formula that is used when the valve is open, the first flow rate calculation formula using a difference between an exponentiation of the upstream pressure (raised to a power higher than 1) and an exponentiation of the downstream pressure (raised to a power higher than 1), to a second flow rate calculation formula that is different from the first flow rate calculation formula, the second flow rate calculation formula using a difference between the upstream pressure and the downstream pressure.

* * * * *